United States Patent
Eckert et al.

(10) Patent No.: US 10,099,937 B2
(45) Date of Patent: Oct. 16, 2018

(54) CONVERSION OF METAL CARBONATE TO METAL CHLORIDE

(71) Applicant: Siemens Aktiengesellschaft, Munich (DE)

(72) Inventors: Helmut Eckert, Roettenbach (DE); Peter Heinz Fischer, Dortmund (DE); Renate Elena Kellermann, Erlangen (DE); Viktor Scherer, Bochum (DE); Martin Schiemann, Castrop-Rauxel (DE); Guenter Schmid, Hemhofen (DE); Dan Taroata, Erlangen (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 0 days.

(21) Appl. No.: 15/118,966

(22) PCT Filed: Feb. 9, 2015

(86) PCT No.: PCT/EP2015/052621
§ 371 (c)(1),
(2) Date: Aug. 15, 2016

(87) PCT Pub. No.: WO2015/121192
PCT Pub. Date: Aug. 20, 2015

(65) Prior Publication Data
US 2017/0050859 A1    Feb. 23, 2017

(30) Foreign Application Priority Data
Feb. 13, 2014   (DE) .......... 10 2014 202 593

(51) Int. Cl.
*C01D 15/04*    (2006.01)
*C01G 9/04*     (2006.01)
(Continued)

(52) U.S. Cl.
CPC ............ *C01D 15/04* (2013.01); *B01J 8/0015* (2013.01); *B01J 8/0278* (2013.01); *B01J 8/085* (2013.01);
(Continued)

(58) Field of Classification Search
CPC .. C01D 15/04; C01D 3/04; C25C 3/02; C25C 1/00; C25C 7/00; B01J 19/087;
(Continued)

(56) References Cited

U.S. PATENT DOCUMENTS

| 3,488,143 A | 1/1970 | Wendell et al. | ................. 423/79 |
| 4,096,234 A | 6/1978 | Martin et al. | ................. 423/135 |

(Continued)

FOREIGN PATENT DOCUMENTS

| CA | 2340528 A1 | 9/2001 | ............... C25B 1/24 |
| DE | 1667419 B2 | 4/1978 | ............. C01B 33/08 |

(Continued)

OTHER PUBLICATIONS

"Database WPI," Section Ch, Week 199045; 1990; Thomson Scientific, London, GB; Class E33, AN 1990-338383; XP002739468, Mar. 16, 1989.

(Continued)

*Primary Examiner* — Amber R Orlando
*Assistant Examiner* — Syed T Iqbal
(74) *Attorney, Agent, or Firm* — Slayden Grubert Beard PLLC (57) ABSTRACT

A process for preparing metal chloride $M^{x+}Cl^{x-}$, in which metal carbonate in solid form is reacted with a chlorinating agent selected from chlorine and oxalyl chloride to give metal chloride $M^{x+}Cl^{x-}$, where the metal M is selected from the group of the alkali metals, alkaline earth metals, Al and Zn, Li and Mg, or Li, and x corresponds to the valency of the metal cation, and wherein metal M is additionally (Continued)

added as a reactant to the metal carbonate/chlorinating agent reaction.

11 Claims, 4 Drawing Sheets

(51) Int. Cl.

| | |
|---|---|
| *C01F 5/32* | (2006.01) |
| *C01D 3/04* | (2006.01) |
| *B01J 8/00* | (2006.01) |
| *C25C 7/00* | (2006.01) |
| *B01J 8/08* | (2006.01) |
| *B01J 8/14* | (2006.01) |
| *B01J 19/08* | (2006.01) |
| *C25B 1/26* | (2006.01) |
| *C25B 9/00* | (2006.01) |
| *C25C 1/00* | (2006.01) |
| *C01F 7/56* | (2006.01) |
| *B01J 8/02* | (2006.01) |
| *C01B 9/02* | (2006.01) |

(52) U.S. Cl.
 CPC ............. *B01J 8/14* (2013.01); *B01J 19/087* (2013.01); *C01B 9/02* (2013.01); *C01D 3/04* (2013.01); *C01F 5/32* (2013.01); *C01F 7/56* (2013.01); *C01G 9/04* (2013.01); *C25B 1/26* (2013.01); *C25B 9/00* (2013.01); *C25C 1/00* (2013.01); *C25C 7/00* (2013.01); *B01J 2208/00893* (2013.01); *B01J 2208/027* (2013.01); *B01J 2219/0803* (2013.01); *B01J 2219/0877* (2013.01)

(58) Field of Classification Search
 CPC ........ B01J 8/0015; B01J 8/0278; B01J 8/085; B01J 8/14; B01J 2208/00893; B01J 2208/027; B01J 2219/0803; B01J 2219/0877; C01B 9/02; C01F 5/32; C01F 7/56; C01G 9/04; C25B 1/26; C25B 9/00
 See application file for complete search history.

(56) References Cited

U.S. PATENT DOCUMENTS

| | | | | |
|---|---|---|---|---|
| 5,089,094 | A | 2/1992 | Ogasawara et al. | 205/405 |
| 5,683,669 | A * | 11/1997 | Hartmann | B01J 19/02 423/491 |
| 6,048,507 | A | 4/2000 | Amouzegar et al. | 423/179.5 |
| 2003/0024449 | A1 | 2/2003 | Martin et al. | 110/268 |
| 2005/0006247 | A1 | 1/2005 | Vandenhaute et al. | 205/606 |
| 2005/0118088 | A1 | 6/2005 | Olbert et al. | 423/416 |
| 2006/0231493 | A1 | 10/2006 | Procida | 210/651 |
| 2007/0224109 | A1 | 9/2007 | Chaifetz et al. | 423/491 |
| 2010/0051470 | A1 * | 3/2010 | Nakamura | C01D 15/04 205/407 |
| 2013/0001097 | A1 | 1/2013 | Nakamura et al. | 205/407 |
| 2013/0260263 | A1 | 1/2013 | Nishijima | 200/600 |
| 2014/0262792 | A1 | 9/2014 | Rosenthal et al. | 205/50 |
| 2015/0159285 | A1 | 6/2015 | Baldauf et al. | 205/560 |

FOREIGN PATENT DOCUMENTS

| | | | | |
|---|---|---|---|---|
| DE | 10137520 | A1 | 2/2003 | F23B 30/02 |
| EA | 200400497 | A1 | 10/2004 | C01G 9/04 |
| EA | 013159 | B1 | 2/2010 | A62D 3/00 |
| EP | 0007803 | A1 | 2/1980 | C01F 5/32 |
| EP | 1685892 | A1 | 8/2006 | B01D 67/00 |
| GB | 561651 | A | 5/1944 | C25C 3/02 |
| JP | 02243510 | A | 9/1990 | C01F 5/32 |
| RU | 2288217 | C1 | 11/2006 | C07C 68/06 |
| SU | 818475 | A3 | 3/1981 | C01F 7/56 |
| WO | 2010/000681 | A2 | 1/2010 | C05C 1/00 |
| WO | 2010/000681 | A3 | 3/2010 | C05C 1/00 |
| WO | 2012/038330 | A2 | 3/2012 | B01D 53/62 |
| WO | 2012/038330 | A3 | 5/2013 | B01D 53/62 |
| WO | 2013/156476 | A1 | 10/2013 | B01D 53/50 |
| WO | 2014/005878 | A1 | 1/2014 | C22B 26/00 |
| WO | 2015/121192 | A1 | 8/2015 | C01B 9/02 |
| WO | 2015/121196 | A1 | 8/2015 | C01B 9/02 |

OTHER PUBLICATIONS

Deberitz, Jürgen, "Lithium, Production and Application of a Fascinating and Versatile Element," Die Bibliotek der Wissenschaft, vol. 2, pp. 37-41, 2006.
"Heated Lithium Placed in Chlorine," Free Science Videos and Lectures Online, URL: http://www.youtube.com/watch?v+ryx5f9CIA-c, 1 pages, 2007.
Hori, Y., "Electrochemical $CO_2$ Reduction on Metal Electrodes," Modern Aspects of Electrochemistry, No. 42, pp. 89-189, 2008.
van Loo, Sjaak et al., "The Handbook of Biomass Combustion & Co-Firing," Earthscan, pp. 134-144, 2008.
Rosen, Brian A. et al., "Ionic Liquid-Mediated Selective Conversion of $CO_2$ to CO at Low Overpotentials," Science, vol. 334, pp. 643-644, Nov. 4, 2011.
DiMeglio, John L. et al., "Selective Conversion of $CO_2$ to CO with High Efficiency Using an Inexpensive Bismuth-Based Electrocatalyst," Journal of the American Chemical Society, vol. 135, 16 pages, Jun. 4, 2013.
German Office Action, Application No. 102014202591.5, 5 pages, dated Mar. 7, 2014.
German Office Action, Application No. 102014202593.1, 8 pages, dated Oct. 28, 2014.
International Search Report and Written Opinion, Application No. PCT/EP2015/052621, 30 pages, dated May 26, 2015.
International Search Report and Written Opinion, Application No. PCT/EP2015/052640, 25 pages, dated Jun. 1, 2015.
Li, Qingwei, "Ten Safe Operative Technologies and Accident Rescue Application Manual for Hazardous Chemicals," Chinese Book Publishing House, p. 1499 (2 pages), 2005.
Chinese Office Action, Application No. 201580008453.1, 16 pages, dated Apr. 6, 2017.
Chinese Office Action, Application No. 201580008652.2, 27 pages, dated Apr. 26, 2017.
Russian Office Action, Application No. 2016133304/04, 7 pages, dated Oct. 11, 2017.
Zhiging, Zhu, "Chemical Engineering," ISBN: 978-7-122-10572-1, Chemical Industry Press, p. 191 (Chinese w/ English Statement of Relevance), May 31, 2011.
Russian Office Action, Application No. 2016130847/05(047940), 7 pages, dated Nov. 30, 2017.
Chinese Office Action, Application No. 201580008652.2, 29 pages, dated Dec. 13, 2017.
U.S. Non-Final Office Action, U.S. Appl. No. 15/119,015, 25 pages.

* cited by examiner

CONVERSION OF METAL CARBONATE TO METAL CHLORIDE

CROSS-REFERENCE TO RELATED APPLICATIONS

This application is a U.S. National Stage Application of International Application No. PCT/EP2015/052621 filed Feb. 9, 2015, which designates the United States of America, and claims priority to DE Application No. 10 2014 202 593.1 filed Feb. 13, 2014, the contents of which are hereby incorporated by reference in their entirety.

TECHNICAL FIELD

The present invention relates to a method for producing metal chloride $M^{x+}Cl_x^-$, wherein metal carbonate as solid is reacted with a chlorinating agent to give metal chloride $M^{x+}Cl_x^-$, the metal M being selected from the group of the alkali metals, alkaline earth metals, Al and Zn, preferably Li and Mg, more preferably Li, and x corresponding to the valence of the metal cation, metal M additionally being added as reactant, and also to an apparatus for implementing the method.

BACKGROUND

WO 2012/038330 and WO 2013/156476 describe how flue gases/off-gases can be treated with the electropositive metals lithium or magnesium in order to give substances of value and high-level thermal energy and thereby to reduce the soiling of the atmosphere.

WO 2012/038330 demonstrates the reaction of $CO_2$ with lithium to give substances of value such as carbon monoxide or acetylene, which can be reacted further to given methanol or other substances of value. The thermal energy released can be utilized to drive the methanol/$CO_2$ separation or even to drive a steam generator.

Reactions and considerations that are relevant in this context include the following:

$2Li+CO_2 \rightarrow Li_2O+CO-314.9$ kJ/mol (comparison: $C+O_2 \rightarrow CO_2-393.5$ kJ/mol)

$4Li+CO_2 \rightarrow 2Li_2O+C-803.94$ kJ/mol $C+CO_2 \rightarrow 2CO+172.5$ kJ/mol; which can be converted into methanol $2C+2Li \rightarrow Li_2C_2$; which can be converted into acetylene (ratio $CO_2$:Li)$Li_2CO_3+4C \rightarrow Li_2C_2+3CO$ $Li_2O+CO_2 \rightarrow Li_2CO_3$; $Li_2CO_3 \rightarrow Li_2O+CO_2$ at the relevant temperatures of around 1500° C.

Enthalpies of formation (298K): $Li_2O=-597.90$ kJ/mol;

$Li_2CO_3=-1215.87$ kJ/mol.

$2Li+2CO_2 \rightarrow Li_2CO_3+CO-539$ kJ

After a hydrolysis, a strongly alkaline $Li_2CO_3$ suspension is obtained.

$Li_2C_2+H_2O \rightarrow HC \equiv CH+2LiOH$ $Li_2O+CO_2 \rightarrow Li_2CO_3$

WO 2013/156476 sets out how the treatments of flue gas/waste gas may also include a desulfurization in view of the high solubility of lithium-sulfur-based salts and the low solubility of lithium carbonate:

$6Li+SO_2 \rightarrow Li_2S+2Li_2O$ $8Li+SO_3 \rightarrow Li_2S+3Li_2O$ $Li_2O+SO_2 \rightarrow Li_2SO_3-438.7$ kJ/mol The suspension obtained after the combustion of $CO_2$ and $SO_2$ with a forced oxidation, said suspension containing $Li_2CO_3$ and $Li_2SO_4$, must then be separated. Fortunately, all lithium-sulfur salts are readily soluble in water (e.g., lithium sulfate at 350 g/l at room temperature (about 25° C.)). In contrast to $Na_2S_2O_5$, ready solubility is also possessed by $Li_2S_2O_5$ or $Li_2SO_3$. This means that all sulfur compounds remain in solution, while $Li_2CO_3$ (solubility 13 g/l) is formed as a precipitate and can be obtained as a fairly pure product for return (see WO 2010/000681). The ready solubility of lithium sulfate here is in contrast with that of $CaSO_4$ (2 g/l), which is prepared in a prior-art desulfurization process.

All of these process sequences end with a slightly wet, fairly pure lithium carbonate. The reduction of lithium carbonate to give metallic lithium may be achieved, for example, by reaction of the carbonate to give the chloride and by the subsequent electrolysis of a eutectic mixture of potassium/lithium chloride.

$Li_2CO_3+2HCl \rightarrow 2LiCl+H_2O+CO_2$  1.

(reaction enthalpy: −96 kJ/mol $Li_2CO_3+Cl_2 \rightarrow 2LiCl+½O_2+CO_2$  2.

(reaction enthalpy: ~5 kJ/mol)

In processes for preparation of lithium chloride for the production of lithium, customarily, either lithium carbonate or lithium hydroxide is caused to react with hydrochloric acid/hydrogen chloride acid in an aqueous solution. Following evaporation and crystallization, the crystals are isolated and dried, to give a highly hygroscopic anhydrous lithium chloride, as described in Jürgen Deberitz, Lithium, Die Bibliothek der Wissenschaft Vol. 2, pp. 37, 2006 (ISBN-13: 978-3-937889-36-8). A substantial difficulty in such a process, as set out in U.S. Pat. No. 6,048,507, is the high energy requirement of theoretically $30 \times 10^3$ kJ/kg. No attention at all has to date been paid to the energy source that is used for the chemical conversion.

A further process, which is described in CA 2340528 A1 and US 20130001097 A1, involves reacting lithium carbonate with chlorine gas to give anhydrous lithium chloride. Preparation of anhydrous lithium chloride from pulverulent lithium carbonate in a fluidized-bed reactor is described in WO 2014/005878.

There continues to be a demand for an improved process for the production of metal chloride from metal carbonate, improved not least in terms of energy.

SUMMARY

One embodiment provides a method for producing metal chloride $M^{x+}Cl_x^-$, wherein metal carbonate as solid is reacted with a chlorinating agent to give metal chloride $M^{x+}Cl_x^-$, the metal M being selected from the group of the alkali metals, alkaline earth metals, Al and Zn, preferably Li and Mg, more preferably Li, and x corresponding to the valence of the metal cation, and wherein metal M is additionally being added as a reactant.

In one embodiment, additionally metal M is used in a metal/metal carbonate weight ratio of less than 5/10, preferably less than 1/10, and more preferably less than 0.5/10, in order to generate thermal energy.

In one embodiment, the metal M is used together with the metal carbonate.

In one embodiment, chlorine or oxalyl chloride, e.g., chlorine, is used as chlorinating agent.

In one embodiment, the metal chloride is subsequently reacted to give metal M, e.g., using electrolysis.

In one embodiment, the metal M produced is reacted at least partly with carbon dioxide to give metal carbonate, to form a metal circuit.

In one embodiment, the reaction takes place in a grid reactor or a mechanically moved fixed-bed reactor or in a cyclone reactor.

In one embodiment, the reaction takes place in a grid reactor, in which the chlorinating agent is added as a gas in cocurrent with the metal carbonate and/or the chlorinating agent is preheated.

In one embodiment, the reaction takes place in a cyclone reactor, which is heated, and/or in that metal M is introduced at different positions in the reaction region.

Another embodiment provides an apparatus for reacting metal carbonate as solid with a chlorinating agent to give metal chloride $M^{x+}Cl_x^-$, the metal M being selected from the group of the alkali metals, alkaline earth metals, Al and Zn, preferably Li and Mg, more preferably Li, and x corresponding to the valence of the metal cation, metal M additionally being added as reactant, the apparatus comprising: a first reactor for the reaction of metal carbonate and the chlorinating agent; a first supply means for metal carbonate, designed to introduce metal carbonate as solid into the first reactor; a second supply means for the chlorinating agent, designed to introduce the chlorinating agent into the first reactor; a first discharge means for metal chloride, designed to remove metal chloride from the first reactor; a second discharge means for gaseous products of the reaction of metal carbonate and the chlorinating agent, designed to remove gaseous products of the reaction of metal carbonate and the chlorinating agent from the first reactor; and a third supply means for metal M, designed to introduce metal M into the first reactor.

In one embodiment, the first reactor for the reaction of metal carbonate and the chlorinating agent is a grid reactor or a mechanically moved fixed-bed reactor or a cyclone reactor.

In one embodiment, the supply of metal M and metal carbonate into the first reactor takes place via a common opening in the first reactor.

In one embodiment, the apparatus further comprises an electrolysis means for metal chloride, designed to electrolyze metal chloride to give metal M and chlorine; a fourth supply means for metal chloride, connected to the first discharge means for metal chloride and designed to supply the metal chloride to the electrolysis means; a third discharge means for metal M, designed to remove metal M from the electrolysis means; and a fourth discharge means for chlorine, designed to remove chlorine from the electrolysis means.

In one embodiment, the apparatus further comprises a second reactor for the reaction of metal M with carbon dioxide to give metal carbonate, designed to react metal M with carbon dioxide; a fifth supply means for metal M, designed to supply metal M to a second reactor; a sixth supply means for carbon dioxide, designed to supply carbon dioxide to the second reactor; a fifth discharge means for metal carbonate, connected to the first supply means and designed to remove metal carbonate from the second reactor; and at least one sixth discharge means for the further products of the reaction of metal M and carbon dioxide, designed to discharge the products of the reaction of metal M and carbon dioxide from the second reactor.

In one embodiment, the apparatus further comprises an electrolysis means for metal chloride, designed to electrolyze metal chloride to give metal M and chlorine; a fourth supply means of metal chloride, connected to the first discharge means for metal chloride and designed to supply the metal chloride to the electrolysis means; a third discharge means for metal M, designed to remove metal M from the electrolysis means; a fourth discharge means for chlorine, designed to remove chlorine from the electrolysis means; a second reactor for the reaction of metal M with carbon dioxide to give metal carbonate, designed to react metal M with carbon dioxide; a fifth supply means for metal M, designed to supply metal M to the second reactor; a sixth supply means for carbon dioxide, designed to supply carbon dioxide to the second reactor; a fifth discharge means for metal carbonate, connected to the first supply means and designed to remove metal carbonate from the second reactor; and at least one sixth discharge means for the further products of the reaction of metal M and carbon dioxide, designed to discharge the products of the reaction of metal M and carbon dioxide from the second reactor; wherein the third discharge means is connected to the fifth supply means.

In one embodiment, the third discharge means is additionally connected to the third supply means.

BRIEF DESCRIPTION OF THE DRAWINGS

Example aspects and embodiments of the invention are discussed in more detail below with reference to the drawings, in which.

DETAILED DESCRIPTION

It has now been found by the inventors that an efficient preparation, efficient not least in terms of energy, of metal chloride from metal carbonate, i.e., for example, a direct chlorination of lithium carbonate using a chlorinating agent, is made possible by additionally metering in metal M during the preparation, which supplies energy for the process. Through the metering in of metal M, instances of contamination and costly dehydrating steps may moreover be avoided.

Moreover, embodiments of the invention provide an efficient sequence of chemical reactions for producing metal chloride and ultimately metal from lithium carbonate.

Some embodiments provide a method for producing metal chloride $M^{x+}Cl_x^-$, where a metal carbonate as solid is reacted with a chlorinating agent to give metal chloride $M^{x+}Cl_x^-$, the metal M being selected from the group of the alkali metals, alkaline earth metals, Al and Zn, preferably Li and Mg, more preferably Li, and x corresponding to the valence of the metal cation, wherein metal M is additionally added as a reactant. According to particular embodiments, the additionally added metal M may also be a metal which differs from the metal ion of the metal carbonate. Thus, for example, where lithium carbonate is the metal carbonate used, lithium, sodium, potassium, calcium and/or magnesium may be added. Generally speaking it is possible to add a metal which is later on not detrimental to the electrolysis of the metal chloride. According to particular embodiments, a metal of this kind, which is different from that of the metal carbonate, may also be advantageous if, for example, a eutectic mixture can be formed for the electrolysis of the metal chloride. According to particular embodiments, the metal M corresponds to that of metal carbonate.

Other embodiments provide an apparatus for reacting metal carbonate as solid with a chlorinating agent to give metal chloride $M^{x+}Cl_x^-$, the metal M being selected from the group of the alkali metals, alkaline earth metals, Al and Zn, preferably Li and Mg, more preferably Li, and x corresponding to the valence of the metal cation, metal M additionally being added as reactant, comprising a first reactor for the reaction of metal carbonate and the chlorinating agent;
a first supply means for metal carbonate, designed to introduce metal carbonate as solid into the first reactor;
a second supply means for the chlorinating agent, designed to introduce the chlorinating agent into the first reactor;
a first discharge means for metal chloride, designed to remove metal chloride from the first reactor; and
a second discharge means for gaseous products of the reaction of metal chloride and the chlorinating agent, designed to remove gaseous products of the reaction of metal carbonate and the chlorinating agent from the first reactor,
further comprising a third supply means for metal M, designed to introduce metal M into the first reactor.

In the context of the invention it is noted that the equations set out by way of example represent net equations, and the chemical events occurring may be significantly more complex.

The present invention relates in a first aspect to a method for producing metal chloride $M^{x+}Cl_x^-$, wherein metal carbonate as solid is reacted with a chlorinating agent to give metal chloride $M^{x+}Cl_x^-$, metal M additionally being added as reactant and x corresponding to the valence of the metal cation (e.g., 1 for Li, 2 for Mg, 3 for Al). In a method of this kind the metal M is selected from the group of the alkali metals, preferably Li, Na, K, Rb, Cs, alkaline earth metals, preferably Mg, Ca, Sr, Ba, Al and Zn. According to particular embodiments, the metal M is Li or Mg, and preferably it is Li. Mixtures of the metals M and/or metal carbonates and/or metal chlorides are also possible. As a result of the addition of metal M, in accordance with the invention, the facility is provided of supporting the weakly endothermic or weakly exotherminc reaction of the metal carbonate with the chlorinating agent by the exothermic reaction of the metal M with the chlorinating agent, so that the thermal energy introduced as a result of this reaction also carries the reaction of the metal carbonate with the chlorinating agent.

According to particular embodiments, no additional thermal energy is introduced into the reaction here, by means, for example, of heating devices, and in particular embodiments it is also possible to obtain thermal energy from the method, which can then be used, for example, for generating steam to drive steam generators and/or for incipiently heating the metal carbonate and/or the chlorinating agent and/or the metal M. According to particular embodiments, the metal M additionally added may also be a metal which is different from the metal ion of metal carbonate. Thus, for example, when using lithium carbonate as metal carbonate, it is possible for lithium, sodium, potassium, calcium and/or magnesium to be added. Generally it is possible to add a metal which causes no harm later during the electrolysis of the metal chloride. According to particular embodiments, a metal which is different from that of the metal carbonate may also be advantageous if, for example, it is possible to form a eutectic mixture for the electrolysis of the metal chloride. According to particular embodiments, the metal M corresponds to that of the metal carbonate.

According to particular embodiments, the metal M is used in a metal/metal carbonate weight ratio of less than 5/10, preferably less than 1/10, and more preferably less than 0.5/10, for the generation of thermal energy. According to particular embodiments, the metal/metal carbonate weight ratio is set such that the reaction in the method of the invention is carried by the generated thermal energy alone, but without generation of excess energy to an excessive extent, which is then used, by cooling and generation of steam, for example, to drive steam generators and/or for incipient heating of the metal carbonate and/or the chlorinating agent and/or the metal M, since losses are inherent in such operations. If, however, there is sufficient metal M present, which is generated, for example, by electrolysis of a metal chloride using excess energy from renewable energies, it is also possible to add a higher proportion of metal M, as for example at times at which there is no excess energy present from renewable energies, so that in that case, current can be generated from the thermal energy generated in the method of the invention. In such a case the metal M represents a kind of energy store, which is generated using excess energy from renewable energies and then releases the energy when it is needed.

According to particular embodiments, the metal M in the method of the invention can be used together with the metal carbonate. In this way, therefore, the method can be simplified, as can also the apparatus for implementing the method. Where metal M and metal carbonate are supplied through an opening in the first reactor, it is also possible to provide for the possibility that the generation of thermal energy takes place from the reaction of M with the chlorinating agent at the location of which it is required for the reaction of the metal carbonate with the chlorinating agent. Through the mixing of metal M and metal carbonate, this generation of thermal energy may optionally be optimized in a suitable way. Metal M can be used in various forms, as for example as solid, in the form of particles, for instance, and/or as liquid, in the form of a melt; in the case of particles or liquid, it may here also be atomized.

In the disclosed method, there is not particular limitation on the chlorinating agent, provided that generation of metal chloride is ensured, in other words that chlorine and/or chlorine radicals are liberated from the chlorinating agent, and the chlorinating agent can be added in gaseous form, in liquid form and/or as a solution in a suitable solvent or in the form of a solid, but is preferably added in gaseous form, in liquid form, or as a solid, more preferably in gaseous form. According to particular embodiments, chlorine, oxalyl chloride, phosgene, diphosgene, or triphosgene, preferably chlorine or oxalyl chloride, more preferably chlorine, is used as chlorinating agent. According to particular embodiments, the chlorinating agent is not phosgene, diphosgene, and/or triphosgene. It is also possible for mixtures of chlorinating agents to be used. Additionally, for example, carbon monoxide may be added as a reagent and/or catalyst. According to particular embodiments there is a dry conversion/reaction of metal carbonate, metal M, and chlorinating agent—in other words, no solvent is used, and preferably only metal carbonate, metal M, and chlorinating agent are introduced and reacted in the first reactor.

Furthermore, according to particular embodiments, there are no further substances introduced into the circuit that must subsequently be separated off again.

The reaction of the metal carbonate and of the metal M with the chlorinating agent may produce gaseous products, such as $CO_2$, $O_2$, CO, etc., for example. These products, by way of a discharge means, for example, may be discharged to the atmosphere and/or stored as products of value and/or caused to react further. Thus, for example, CO may be reacted with hydrogen to form alkanes, alkenes, alcohols, etc.

In certain embodiments, following the reaction of metal carbonate and metal M with the chlorinating agent, the metal chloride is converted back to metal M, preferably by electrolysis. In addition to electrolysis, the conversion may also take place in another suitable way.

There are no particular restrictions here on the preferred electrolysis, which may comprise, for example, the melt flux electrolysis of a compound of the formula $M^{x+}Cl_x^-$, or the electrolysis of an aqueous solution of the compound of the formula $M^{x+}Cl_x^-$.

When a melt flux electrolysis of the metal chloride of the formula $M^{x+}Cl_x^-$ is used, the advantage arises that a relatively high efficiency is achieved and, moreover, there is no hydrogen by-product produced, which may be unwanted. Alternatively, the electrolysis takes place by electrolysis of an aqueous solution of the compound of formula $M^{x+}Cl_x^-$ with production of hydrogen, this hydrogen may be used, for example, as a value product or may, according to particular embodiments, be reactive with the carbon monoxide generated in the reaction of metal carbonate, metal M, and chlorinating agent, to form further chemical products, such as to form alkanes, alkenes, alcohols, etc.

In order to achieve more efficient electrolysis at low temperatures, for example, a eutectic salt mixture with the compound of the formula $M^{x+}Cl_x^-$ may be generated in order to lower the melting point, for example, by addition of suitable additives, with this salt mixture then being electrolyzed. In that case, however, a possible disadvantage is that the metal M is obtained as a mixture with other metals and may therefore have to be separated from them. If using, for example, Li as metal M, it may be separated off later than low-solubility lithium carbonate, in the case of the electrolysis of LiCl, for example, and so such a disadvantage does not automatically arise.

In particular embodiments, in the reaction of metal carbonate and metal M with the chlorinating agent, in accordance with the invention, additional thermal energy may be recovered, and may, where appropriate, be into electrical energy and/or used for preheating metal M and/or metal carbonate and/or the chlorinating agent. The electrical energy can also be used for the electrolysis of metal chloride, as set out above. According to preferred embodiments, the energy for the electrolytic conversion of $M^{x+}Cl_x^-$ to M and $Cl_2$ is provided substantially from excess energy, for example, from renewable energies or from conventional energy sources, in other words, for example, to an extent of more than 30%, preferably more than 70%, more preferably more than 80%, and very preferably more than 90%, based on the energy requirement of the electrolysis. Excess energy from renewable energies is available for these purposes, for example, when more power is provided by renewable and/or conventional energy sources than is drawn off by the consumers. The reference here more particularly is to the energy which is provided in excess by renewable energy sources such as solar plants, wind plants, water power plants, geothermal plants, bio power plants (biomass) or the like and which cannot be drawn off by consumers locally, regionally and/or supra regionally at the time of its generation. It is possible here that energy is also acquired from other sources, as for example from conventional power sources and/or from the above-generated energy in the reaction of metal carbonate and metal M with the chlorinating agent. According to particularly preferred embodiments, the energy which is used for the electrolysis of the compound of the formula $M^{x+}Cl_x^-$, is acquired 100% from renewable energy sources; for the operation of the electrolysis means, energy which is not directly associated with the electrolysis of the compound of the formula $M^{x+}Cl_x^-$, such as for lighting purposes or to operate pumps, etc., for example, may also come from other energy sources, but also from renewable energy sources.

According to particular embodiments, the metal M generated is reacted at least partly, as for example to an extent of more than 20 wt %, more than 50 wt %, or more than 80 wt %, more than 90 wt % or more than 95 wt %, with carbon dioxide to give metal carbonate, thus forming a metal circuit. Also conceivable is a complete reaction (100 wt %) of the metal M produced with carbon dioxide to give metal carbonate. This may be dependent, for example, on the market demand for the metal M and/or else on the availability of energy, such as excess energy from renewable energies, for example. Alternatively, the metal M may also be reacted after a first, different reaction with carbon dioxide to give metal carbonate, for example by initial preparation of metal nitride, which then reacts, after hydrolysis, with carbon dioxide to give metal carbonate. There may also be both a direct reaction of the metal M with carbon dioxide and a first different reaction of the metal M, with nitrogen, for example, and subsequent reaction with carbon dioxide, in which case, here as well, more than 20 wt %, more than 50 wt %, or more than 80 wt %, more than 90 wt % or more than 95 wt %, of the metal M may be reacted. Here again, complete reaction (100 wt %) of the metal M produced to give metal carbonate is conceivable.

In a metal circuit of this kind, the individual steps, i.e., the reaction of metal carbonate and metal M with the chlorinating agent, the reaction of the metal chloride to give metal M and chlorine, and also the reaction of the metal M with carbon dioxide, may also take place at different times, as for example on different days, months or seasons, according for example to the availability of excess energy from renewable energies, and also at different locations; in this case, the individual compounds produced, metal chloride, metal M and metal carbonate, may in that case be transported to the individual locations in a suitable way, as for example by rail, truck, ship, conveyor belt, pipe, etc., and may be stored there and/or, optionally, at the location of their generation. It is also possible, from the chlorine produced, to regenerate the chlorinating agent and/or chlorine as chlorinating agent, and so to store it or transport it.

The process and also an apparatus for generating metal carbonate from metal M and carbon dioxide are not subject to any particular restriction and may include, for example, combustion of metal M, optionally with melting and/or preheating of the metal M, in a carbon dioxide-containing atmosphere, optionally with ignition of the metal M, and here as well the individual operations which require energy may be carried out using, for example, excess energy from renewable energies, or alternatively, optionally, energy from an exothermic combustion of metal M with the carbon dioxide. In the reaction of metal M and carbon dioxide or carbon dioxide-containing atmosphere, which may also comprise air, nitrogen, etc., for example, it is also possible for various, possibly gaseous products of value to be obtained, such as acetylene, CO, hydrogen, oxygen, ammonia, etc., which may be reacted further or stored and/or used as such. In this context it may also be possible that the metal carbonate is obtained in a mixture with other solids, from which it can be separated where appropriate.

According to particular embodiments, the reaction of metal carbonate and metal M with the chlorinating agent takes place in a grate reactor or in a mechanically moved fixed-bed reactor or in a cyclone reactor.

The grate reactor, the mechanically moved fixed-bed reactor, and the cyclone reactor here are not subject to particular restriction in accordance with the invention.

According to particular embodiments, the reaction takes place in a grate reactor wherein the chlorinating agent is added as a gas, cocurrently with the metal carbonate and/or the chlorinating agent is preheated.

Figure 1:
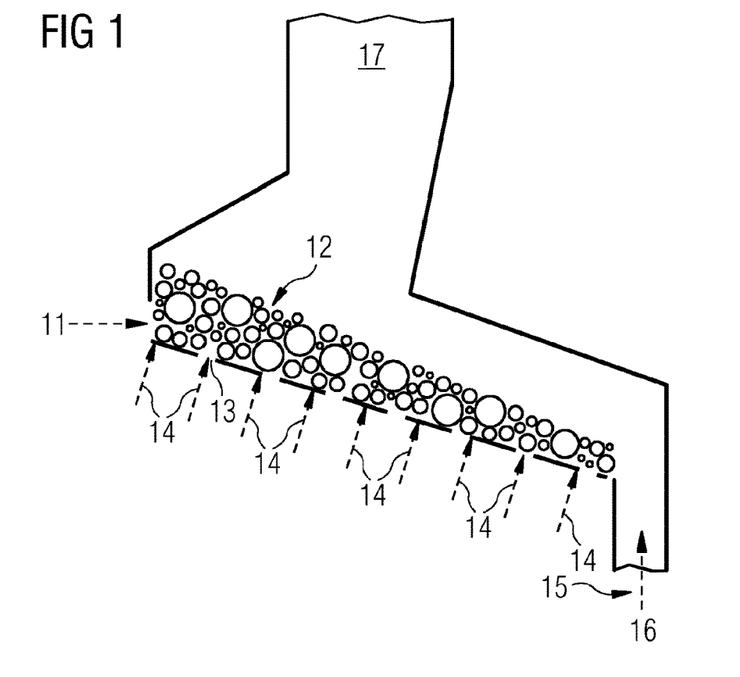
FIG. 1 shows schematically a grid reactor which can be used in a method of the invention and in an apparatus of the invention.

An exemplary grate reactor is shown in FIG. 1. Via a supply means 11 for metal carbonate and metal M, the metal carbonate and the metal M are introduced into the grate reactor, and so a metal carbonate/metal bed 12 is formed on the grate 13; the supplying of metal carbonate and metal M may also take place through separate openings and/or supply means. The supplying 14 for the chlorinating agent takes place through the grate 13. As shown in FIG. 1, the supplying 14 of the chlorinating agent may take place over the entire grate 13, but it is not impossible for the chlorinating agent to be also supplied 14 only in partial regions of the grate 13, as for example near to the supply means 11 for metal carbonate and/or metal M, and/or for the supplying 14 of the chlorinating agent to take place with different amounts of substance and/or masses and/or volumes at different locations of the grate 13. Moreover, the chlorinating agent supplied may, according to particular embodiments, be heated prior to being supplied 14, via a heating means, for example, and/or by heated off gas and/or heated solid and/or heated liquid, in the operation of the invention. At the end, the reacted and/or possibly unreacted solid can be taken off via a takeoff means 15 for solid comprising metal chloride, as for example through a drop shaft 16. Gaseous products of the reaction of the metal carbonate and the chlorinating agent may be taken off via a takeoff means 17 for gaseous products of the reaction of metal carbonate and the chlorinating agent.

Grates are established for converting solids with long residence times, and one example thereof is grate firing, as set out in Loo, Sjaak van; Koppejan, Jaap: Handbook of Biomass Combustion. London: Earthscan, pp. 134-144, 2008 by way of example. The principle of grate firing is well known and widely developed. As also shown by way of example in FIG. 1, a solid participating in the reaction may be supplied at the upper end of the grate 13.

Figure 2:
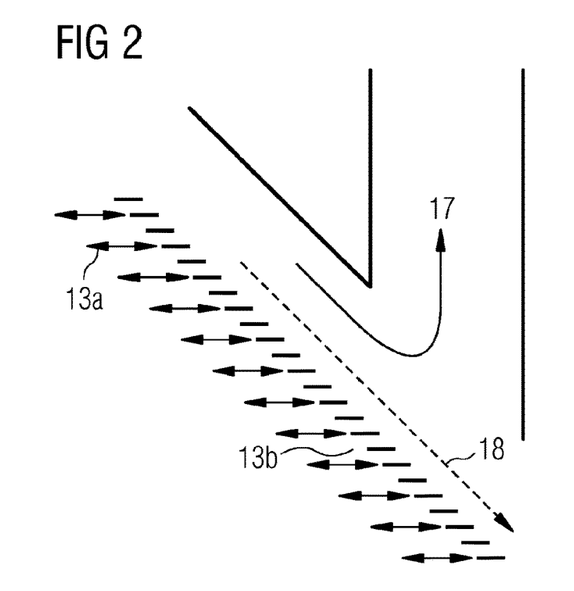
FIG. 2 shows schematically a detail view of an exemplary embodiment of a grid reactor which can be used in a method of the invention and in an apparatus of the invention.

Since the solid has to be transported from the reaction space via the grate 13, in order to ensure continuous operation of the reactor, the grate, according to particular embodiments, consists of moving parts, allowing the solid to be transported. FIG. 2 outlines the principle of an exemplary advancer grate for such transport. With this grate, the grate 13 is constructed from individual bars 13a, 13b, of which, for example, every second bar 13a is movable horizontally, whereas the other bars 13b are fixed. As a result, both transport and stoking of the solid can be efficiently ensured. Here, all movable bars, for example, may possess a common drive and so be moved in equal phase.

Another option is to divide the bars into groups or even to drive them individually, allowing the reaction process to be controlled very precisely and ensuring a complete reaction, as set out in DE 10137520 A1. An appropriate movement pattern of the grate rods may allow control and standardization of the layer thickness of the fuel/solid lying on the grate, as solids stream 18. In connection with the exemplary process gas supplied comprising the chlorinating agent from the underside of the grate (undergrate), therefore, the bed of solids has a homogeneous flow through it; alternatively, the process gas may also be otherwise supplied. The variant depicted, with the through-flow from the underside, may result in minimization of the dust output as well as the uniform reaction of the solid. In order to ensure both uniform complete reaction and low dust discharge, according to particular embodiments, the layer thickness may be monitored, using appropriate sensors and/or cameras, for example, and/or there may be controlled supplying of the chlorinating agent over the entire bed region.

FIG. 2, moreover, shows the discharge of the exemplary converted process gas by the discharge means 17 in cocurrent, and this may take place by way of example, although it is also possible for two or more discharge means 17 to be provided or for the process gas converted to be discharged in another way. The discharge of the excess, possibly partly unreacted process gas is accomplished, for example, according to particular embodiments, at the end of the solids discharge from the reactor chamber.

An exemplary operation of the reaction of lithium carbonate and lithium as metal carbonate and metal M with chlorine as a chlorinating agent in a grid reactor is shown herein below. This reaction is very slightly endothermic. In this case, in order to introduce the energy required for the reaction, lithium itself, or else alternatively another metal M which is compatible with the overall process, particularly with the electrolysis of the metal chloride, is used, in order to avoid contamination and costlydehydration steps. The enthalpy of formation of LiCl, or the enthalpy of formation of a corresponding metal chloride, is sufficiently high (−409 kJ/mol for LiCl) that only 1-2 percent of, for example, electrolytically produced lithium need be invested in the reprocessing operation in order to achieve this important step.

Lithium may be introduced into the reactor in, for example, liquid or atomized form (e.g., via solid lithium, which is heated to a temperature of >180° C. and atomized), or can be admixed in the form of solid lithium particles.

Since the reaction of lithium carbonate and chlorine is slightly endothermic, and on efficiency grounds only a small supply of energy sources ought to be necessary, the reaction ought preferably to take place at a very low temperature. According to particular embodiments, this necessitates a long residence time for the complete conversion of the $Li_2CO_3$ into LiCl. Various reactor concepts are available that permit a relatively long residence time of a solid in the reaction zone. The substances to be taken into account make it possible for a grid plant to be used.

With the above operation, which experiences a weakly exothermic thermal change only through addition of pure lithium as energy source, the heat flow follows the $Li_2CO_3$. Where the pure lithium is added at the start of the grid, increased release of heat will take place in this region because of the concentration gradient. By means of a cocurrent version, the heat that is not needed in this region can be passed into regions situated further downstream in the grid. Moreover, with increasing conversion on the grid, there is a decrease to be expected in the reaction rate, by virtue of decreasing $Li_2CO_3$ concentration and consumption of the pure lithium. This may make it rational for the process gas to be preheated, an operation which leads, together with the process gas feed in cocurrent, to the heating of the bed of solids. The two measures, process gas preheating and cocurrent process gas feed, are able to counter the decreasing reaction rate and to enable complete conversion.

According to further particular embodiments, the reaction may take place in a cyclone reactor, which is heated, and/or wherein the metal M is introduced at different positions in the reaction region.

Figure 3:
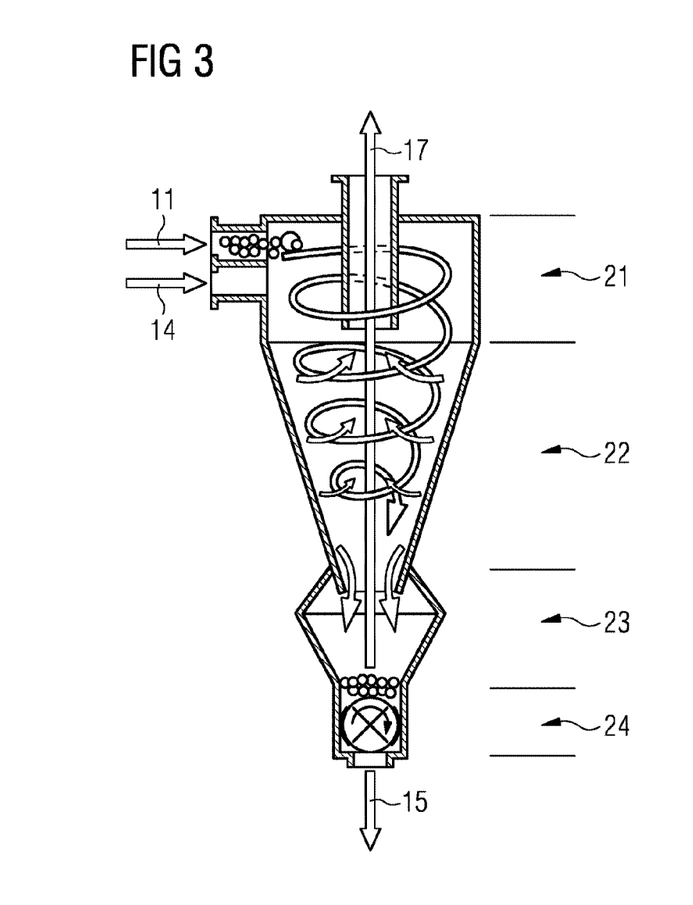
FIG. 3 shows schematically a cyclone reactor which can be used in a method of the invention and in an apparatus of the invention.
Figure 4:
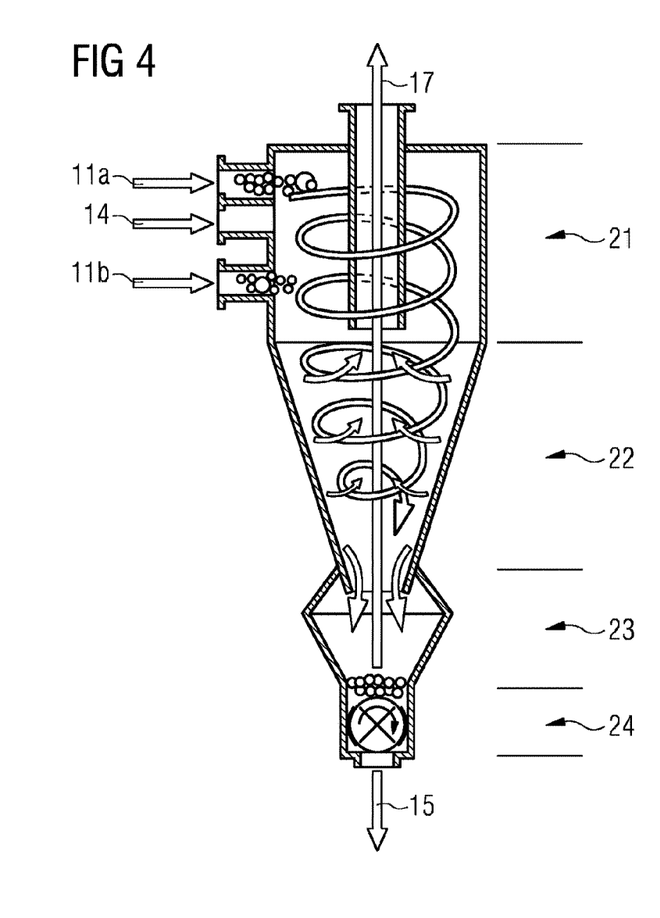
FIG. 4 shows schematically a further cyclone reactor which can be used in a method of the invention and in an apparatus of the invention.

Exemplary cyclone reactors are shown in FIGS. 3 and 4, with the cyclone reactors in FIGS. 3 and 4 being largely of the same construction, except that the cyclone reactor shown in FIG. 3 comprises a supply means 11 for metal carbonate and metal M, whereas the cyclone reactor shown in FIG. 4 has a separate supply means 11a for metal carbonate and is a separate supply means 11b for metal M. Both cyclone reactors shown, moreover, have a supply 14 for the chlorinating agent, a discharge means 15 for solid material comprising metal chloride, and a discharge means 17 for gaseous products of the reaction of metal carbonate and the chlorinating agent in which case it has components comprising, for example, a reaction region 21, in the form for example of a rotationally symmetrical upper part, a separation region 22, which for example has a conical design, as shown in the figure, a letdown chamber 23, and a star wheel 24 as an example of a discharge means for solids, of the kind present, for example, in a cyclone separator. Alternatively the cyclone reactor of the invention may have a different construction. It is also possible, moreover, to provide a plurality of discharge means 17 or to configure the discharge of the reacted process gas differently. The solid discharged may also comprise not only metal chloride but also other substances such as unreacted reactants or others.

By way of example, a cycle reactor can be used for the reaction of $Li_2CO_3$ with chlorine gas to give LiCl, the reaction taking place, for example, in the form of a cyclone separator. Here the lithium carbonate and the chlorine gas for example, are blown tangentially into a rotationally symmetrical upper part, as reaction region 21, and accordingly are fluidized with one another and set into rotation. Since the desired reaction of the two products to give lithium chloride is endothermic, reaction energy is additionally required. This may be provided by pure lithium admixed to the $Li_2CO_3$, and also, optionally, in the form of thermal energy by an external heating source around the reaction region. The enthalpy of formation of LiCl here is sufficiently high (−409 kJ/mol) that, for example, only 1-2 percent of electrolytically produced lithium is invested back into the reprocessing operation.

This lithium may be introduced into the reactor for example, either in solid form, as lithium particles, for example, or as liquid, jetted lithium. For more effective control of the reaction process it is conceivable for the lithium to be introduced at different positions in the reaction region, as also shown in FIG. 4.

As a result of gravity and of rotation, both the solid (e.g., LiCl) and the gaseous (e.g., $O_2$, $CO_2$) reaction products run on a spiral trajectory from the reaction region 21 downward into the conical separation region 22. The tapering in the separation region 22 causes the rotational velocity to go up increasingly, and so solid particles are spun to the walls by the centrifugal force, and in that process are slowed down to an extent such that they part from the flow and fall downward into the letdown chamber 23. The gases separated as a result can then be taken off from the reactor upward by a central dip tube. The solids separated in the letdown chamber 23 can be removed during operation by way of a star wheel 24, for example.

The present invention further relates to an apparatus in which the method of the invention can be carried out.

According to one aspect, the present invention relates to an apparatus for the reaction of metal carbonate as solid with a chlorinating agent to give metal chloride $M^{x+}Cl_x^-$, the metal M being selected from the group of the alkali metals, alkaline earth metals, Al and Zn, preferably Li and Mg, more preferably Li, and x corresponding to the valence of the metal cation, metal M additionally being added as reactant, comprising a first reactor for the reaction of metal carbonate and the chlorinating agent;

a first supply means for metal carbonate, designed to introduce metal carbonate as solid into the first reactor;

a second supply means for the chlorinating agent, designed to introduce the chlorinating agent into the first reactor;

a first discharge means for metal chloride, designed to remove metal chloride from the first reactor; and a second discharge means for gaseous products of the reaction of metal chloride and the chlorinating agent, designed to remove gaseous products of the reaction of metal carbonate and the chlorinating agent from the first reactor, further comprising a third supply means for metal M, designed to introduce metal M into the first reactor.

In accordance with the invention, according to particular embodiments, it is not ruled out that with the first discharge means for metal chloride, other solids or other substances, as well as the metal chloride, are also removed from the first reactor, examples including unreacted metal carbonate and/or metal M, and also further reaction products of metal carbonate and/or metal M with the chlorinating agent.

In particular embodiments, the first reactor for the reaction of metal carbonate and the chlorinating agent is a grate reactor or a mechanically moved fixed-bed reactor or a cyclone reactor. In the apparatus of the invention, moreover, metal M and metal carbonate may be supplied into the first reactor via a common opening in the first reactor.

According to particular embodiments, the apparatus of the invention may further comprise an electrolysis means for metal chloride, designed to electrolyze metal chloride to give metal M and chlorine, a fourth supply means for metal chloride, connected to the first discharge means for metal chloride and designed to supply the metal chloride to the electrolysis means, a third discharge means for metal M, designed to remove metal M from the electrolysis means, and a fourth discharge means for chlorine, designed to remove chlorine from the electrolysis means. Also present possibly, for example, is an additional discharge means, designed to discharge further reaction products of the electrolysis of metal chloride, as for example in the reaction of a solution of metal chloride, in which case beforehand a solvent such as water, etc., has been supplied to the metal chloride, from the electrolysis means. There are no particular restrictions here on the construction of the electrolysis means, and it may encompass commonly used electrolysis means, such as, for example, for melt flux electrolysis or for electrolysis of solutions, preferably for melt flux electrolysis.

According to particular embodiments, it is not ruled out that with the third discharge means for metal M, other solids or other substances, as well as the metal M, are also removed, such as, for example, flux auxiliaries, unreacted metal chloride and/or further reaction products of the electrolysis.

The apparatus of the invention may further comprise, or additionally comprise in accordance with particular embodiments, a second reactor for the reaction of metal M with carbon dioxide to give metal carbonate, designed to react metal M with carbon dioxide, a fifth supply means for metal M, designed to supply metal M to the second reactor, a sixth supply means for carbon dioxide, designed to supply carbon dioxide to the second reactor, a fifth discharge means for metal carbonate, connected to the first supply means and designed to remove the metal carbonate from the second reactor, and at least one sixth discharge means for the further products of the reaction of metal M and carbon dioxide, designed to discharge the products of the reaction of metal M and carbon dioxide from the second reactor. Encompassed here may also be two or more discharge means for the further products of the reaction of metal M and carbon dioxide. There are no particular restrictions on the second reactor here, and it may for example be a combustion reactor.

According to particular embodiments, it is not ruled out that with the fifth discharge means for metal carbonate, other solids or other substances, as well as the metal carbonate, are removed, such as, for example, unreacted metal M and/or further reaction products of the reaction of metal M and carbon dioxide.

According to particular embodiments, an apparatus of the invention comprises an electrolysis means for metal chloride, designed to electrolyze metal chloride to give metal M and chlorine;
a fourth supply means of metal chloride, connected to the first discharge means for metal chloride and designed to supply the metal chloride to the electrolysis means;
a third discharge means for metal M, designed to remove metal M from the electrolysis means;
a fourth discharge means for chlorine, designed to remove chlorine from the electrolysis means;

a second reactor for the reaction of metal M with carbon dioxide to give metal carbonate, designed to react metal M with carbon dioxide;
a fifth supply means for metal M, designed to supply metal M to the second reactor;
a sixth supply means for carbon dioxide, designed to supply carbon dioxide to the second reactor;
a fifth discharge means for metal carbonate, connected to the first supply means and designed to remove metal carbonate from the second reactor; and
at least one sixth discharge means for the further products of the reaction of metal M and carbon dioxide, designed to discharge the products of the reaction of metal M and carbon dioxide from the second reactor;
wherein the third discharge means is connected to the fifth supply means.

Here again, according to particular embodiments, it is not ruled out that with the third discharge means for metal M, other solids or other substances, as well as the metal M, are removed, such as, for example, flux auxiliaries, unreacted metal chloride and/or further reaction products of the electrolysis, and/or that with the fifth discharge means for metal carbonate, other solids or other substances, as well as the metal carbonate, are removed, such as, for example, unreacted metal M and/or further reaction products of the reaction of metal M and carbon dioxide.

According to particular embodiments, the third discharge means is additionally connected to the third supply means. In this way, moreover, metal M can be recycled, and so no addition or less addition of metal M to the method of the invention is necessary. In this context, however, it is not ruled out that further metal M is supplied to the first reactor via a further, separate third supply means or via the same third supply means.

Furthermore, the first and/or second reactor and/or the electrolysis means may also comprise additional means such as cooling means, heating means, heat exchangers, pumps, etc. Such means may also be provided on the various supply and discharge means. The nature of the supply and discharge means is subject to any particular restriction, and may be selected or provided appropriately—for example, as opening, grate, lattice, drop shaft, etc. The connection between the various supply and discharge means, as described by way of example above and below, may be provided in a suitable way, as for example by conveyor belts, pipes, etc., but also in the sense of stores and suitable transport facilities.

The above embodiments, configurations and developments can be combined arbitrarily with one another in so far as is rational. Further possible configurations, developments, and implementations of the invention also encompass combinations not explicitly stated of invention features described before or below with reference to the working examples. In particular, the skilled person will also add individual aspects, as improvements or supplements, to the respective basic form of the present invention.

An exemplary process for the direct chlorination of lithium carbonate by means of chlorine is set out below. The energy for this process is generated by the metering of lithium into the reaction process. As shown above, the conversion energy, at ~5 kJ/mol, is only in the percentage range of the combustion enthalpies. This amount of energy is therefore invested in order to ensure the energy-efficient reutilization of lithium carbonate for the electrolysis. Moreover, according to particular embodiments, no further substances are introduced into the circuit that would require subsequent removal again.

Examples of apparatus of the invention are shown diagrammatically in FIGS. 5 to 10.

Figure 5:
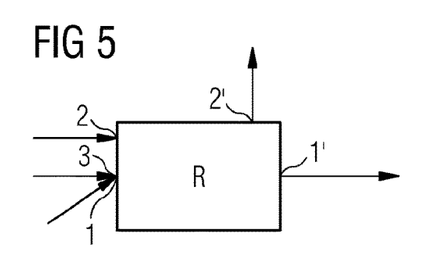
FIG. 5 shows schematically an exemplary embodiment of the present invention.

FIG. 5 shows a first exemplary embodiment in which metal carbonate is supplied via a first supply means 1 for metal carbonate, and metal M is supplied via a third supply means 3 for metal M, to the first reactor R for the reaction of metal carbonate with a solid chlorinating agent via a common opening to give metal chloride. Here, the substance streams of the first supply means 1 for metal carbonate and of the third supply means 3 for metal M may be brought together directly at the first reactor R or even before. Via a second supply means 2 for the chlorinating agent, moreover, the first reactor R is supplied with the chlorinating agent. From the first reactor R, then, metal chloride is discharged via a first discharge means 1' for metal chloride, and gaseous products of the reaction of metal carbonate and the chlorinating agent are discharged via a second discharge means 2' for gaseous products of the reaction of metal carbonate and the chlorinating agent.

Figure 6:
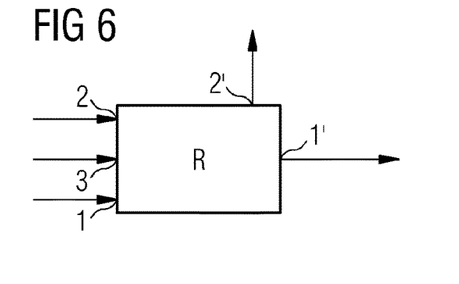
FIG. 6 shows schematically a further exemplary embodiment of the present invention.

A second exemplary embodiment is shown in FIG. 6, in which, in contrast with the first exemplary embodiment, the metal carbonate is supplied via a first supply means 1 for metal carbonate and the metal M is supplied via a third supply means 3 for metal M to the first reactor R via separate openings.

Figure 7:
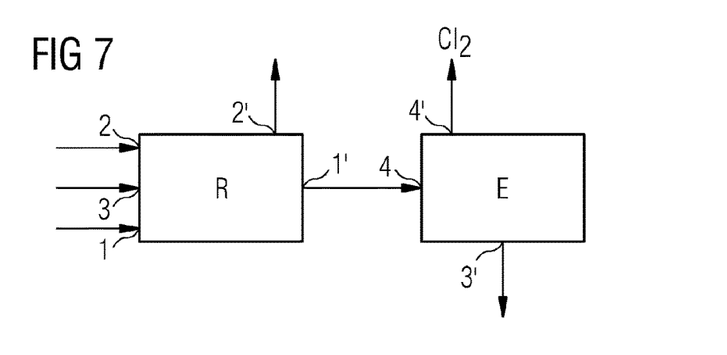
FIG. 7 shows schematically an exemplary embodiment of the present invention which further comprises an electrolysis means.

A third exemplary embodiment, which is shown in FIG. 7, corresponds to the second exemplary embodiment, where the metal chloride discharged by the first discharge means 1' for metal chloride is supplied via a fourth supply means 4 for metal chloride to an electrolysis means E, where it is electrolyzed. From the electrolysis means E, metal M is then discharged via a third discharge means 3' for metal M, and chlorine via a fourth discharge means 4' for chlorine. In the case of an embodiment of this kind, however, it is not ruled out that metal carbonate and metal M are supplied to the first reactor R as in the first exemplary embodiment. Also not ruled out is the supplying of metal chloride to the electrolysis means E from a different source than the first reactor R, additionally.

Figure 8:
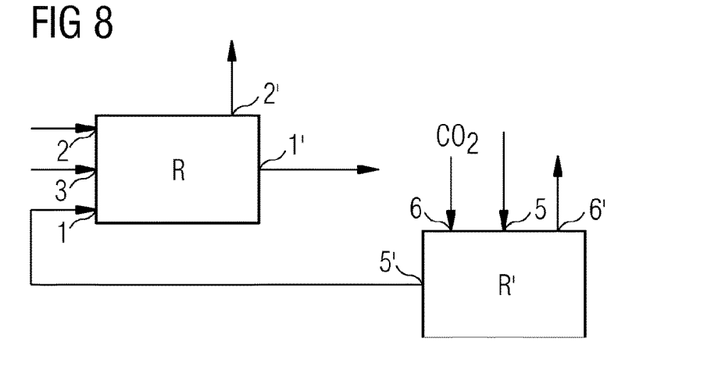
FIG. 8 shows schematically an exemplary embodiment of the present invention, additionally comprising a second reactor.

A fourth exemplary embodiment is outlined in FIG. 8 and initially corresponds again to the second embodiment, with the metal carbonate, supplied by the first supply means 1 for metal carbonate to the first reactor R, originating from a second reactor R' for the reaction of metal M with carbon dioxide to give metal carbonate, from which it is discharged by a fifth discharge means 5' for metal carbonate, which is connected to the first supply means 1 for metal carbonate. Supplied to the second reactor R' are metal M via a fifth supply means 5 for metal M, and carbon dioxide via a sixth supply means 6 for carbon dioxide, and, moreover, further products of the reaction of metal and carbon dioxide are discharged via a sixth discharge means 6' for the further products of the reaction of metal M and carbon dioxide. In the case of an embodiment of this kind, however, it is not ruled out that metal carbonate and metal M are supplied to the first reactor R as in the first exemplary embodiment. It is also not ruled out that the first reactor R is additionally supplied with metal carbonate from a different source than the second reactor R'.

Figure 9:
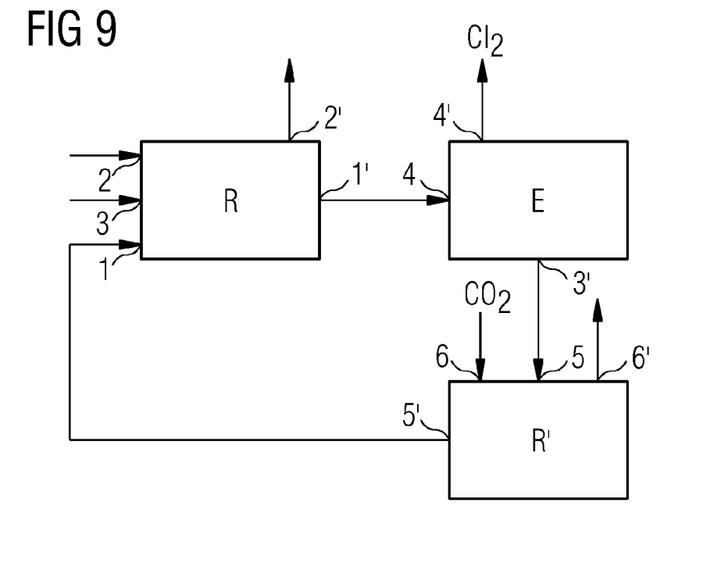
FIG. 9 shows schematically an exemplary embodiment of the present invention, which additionally comprises an electrolysis means and a second reactor.

The exemplary fifth embodiment shown in FIG. 9 corresponds initially to the third exemplary embodiment, where the metal carbonate, supplied via the first supply means 1 for metal carbonate to the first reactor R, originates from a second reactor R' for the reaction of metal M with carbon dioxide to give metal carbonate, from which it is discharged by a fifth discharge means 5' for metal carbonate, which is connected to the first supply means 1 for metal carbonate. Supplied to the second reactor R' are metal M via a fifth supply means 5 for metal M, and carbon dioxide via a sixth supply means 6 for carbon dioxide, and, moreover, further products of the reaction of metal M and carbon dioxide are discharged via a sixth discharge means 6' for the further products of the reaction of metal M and carbon dioxide. The metal M for reaction in the second reactor R' originates, at least partly, from the electrolysis means E, and here the fifth supply means 5 for metal M is connected to the third discharge means 3' for metal M. With an embodiment of this kind, however, it is not ruled out that metal carbonate and metal M are supplied to the first reactor R as in the first exemplary embodiment. It is also not ruled out that the first reactor R is supplied with metal carbonate from a different source than the second reactor R', and/or that metal chloride is supplied to the electrolysis means E from a different source than the first reactor R, and/or that metal M is supplied to the second reactor R' from a different source than the electrolysis means E, additionally.

Figure 10:
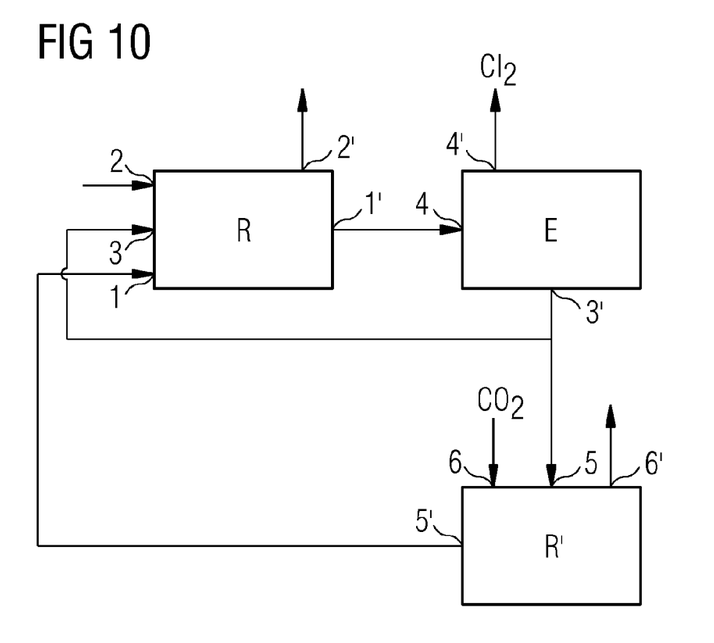
FIG. 10 shows schematically a further exemplary embodiment of the present invention, which additionally comprises an electrolysis means and a second reactor.

A sixth exemplary embodiment is shown in FIG. 10, and corresponds very largely to the fifth exemplary embodiment, except that a portion of the metal M is supplied from the electrolysis means E to the first reactor R; in other words, the third discharge means 3' is additionally connected to the third supply means 3. In an embodiment of this kind, however, it is not ruled out that metal carbonate and metal M are supplied to the first reactor R as in the first exemplary embodiment.

Also not ruled out is that the first reactor R is additionally supplied with metal carbonate from a different source than the second reactor R' and/or that metal chloride is additionally supplied to the electrolysis means E from a different source than the first reactor R, and/or that metal M is additionally supplied to the second reactor R' and/or to the first reactor R from a different source than the electrolysis means E.

The present invention relates to a method and apparatus wherein metal carbonate, lithium carbonate for example, is reacted with a chlorinating agent, chlorine for example, where metal M, lithium for example, is additionally added in order to produce the energy required for the reaction and to avoid instances of contamination and costly dehydrating steps. According to particular embodiments, the chlorinating agent is provided from an electrolysis of the metal chloride, lithium chloride for example, and from any completed reaction to give the chlorinating agent.

For the implementation of an efficient metal circuit with metal carbonate, it is preferred for the metal carbonate firing product from a reaction of metal M and carbon dioxide to be able to be reprocessed into metal chloride for the electrolysis. In accordance with the invention, according to particular embodiments, the preparation of metal chloride by the direct chlorination of metal carbonate using the chlorine originating from the electrolysis is utilized.

This is shown by way of example for the reaction of lithium carbonate and chlorine:

(reaction enthalpy: ~5 kJ/mol)

What is claimed is:

1. A method for producing metal chloride $M^{x+}Cl_x^-$, comprising:
   providing a chlorinating agent,
   reacting metal carbonate as a solid with the chlorinating agent to form metal chloride $M^{x+}Cl_x^-$, metal M selected from the group consisting of the alkali metals, alkaline earth metals, Al and Zn, Li and Mg, and Li, and wherein x corresponds to the valence of the metal cation, and additionally adding a second metal M2, different from metal M, selected from the group consisting of alkali metals, alkaline earth metals, Al and Zn, Li and Mg, and Li as a reactant to the reaction of metal carbonate with the chlorinating agent.

2. The method of claim 1, wherein the second metal M2 is added as a reactant with a metal/metal carbonate weight ratio of less than 5/10 in order to generate thermal energy.

3. The method of claim 2, wherein the second metal M2 is used together with the metal carbonate for the reaction with the chlorinating agent.

4. The method of claim 1, wherein the chlorinating agent comprises chlorine or oxalyl chloride.

5. The method of claim 1, wherein the metal chloride is subsequently reacted to produce metal M.

6. The method of claim 5, wherein the metal M produced by the subsequent reaction of the metal chloride is reacted at least partly with carbon dioxide to produce metal carbonate, to form a metal circuit.

7. The method of claim 1, wherein the reaction occurs in a grid reactor or a mechanically moved fixed-bed reactor or in a cyclone reactor.

8. The method of claim 7, wherein the reaction occurs in a grid reactor, in which the chlorinating agent is added as a gas in cocurrent with the metal carbonate.

9. The method of claim 7, wherein the reaction occurs in a cyclone reactor, which is heated, and in which the second metal M2 is introduced at different positions in the reaction region.

10. The method of claim 1, wherein the metal M has a metal/metal carbonate weight ratio of less than 1/10 in order to generate thermal energy.

11. The method of claim 1, wherein the metal M has a metal/metal carbonate weight ratio of less than 0.5/10 in order to generate thermal energy.

* * * * *